United States Patent [19]

Kumasaka et al.

[11] Patent Number: 4,847,715
[45] Date of Patent: Jul. 11, 1989

[54] MAGNETIC HEAD HAVING SHORT DISTANCE BETWEEN GAPS FOR RECORDING REPRODUCING AND ERASING

[75] Inventors: Noriyuki Kumasaka, Ohme; Shigekazu Otomo, Sayama; Takeo Yamashita, Tachikawa; Noritoshi Saito, Tokyo, all of Japan

[73] Assignee: Hitachi, Ltd., Tokyo, Japan

[21] Appl. No.: 941,648

[22] Filed: Dec. 15, 1986

[30] Foreign Application Priority Data

Dec. 13, 1985 [JP] Japan .................................. 60-278930

[51] Int. Cl.⁴ .......................... G11B 5/187; G11B 5/23; G11B 5/127
[52] U.S. Cl. ..................................... 360/122; 360/118; 360/119; 360/125
[58] Field of Search ................ 360/125, 126, 127, 118, 360/119, 121, 122, 123, 120

[56] References Cited

U.S. PATENT DOCUMENTS 4,701,819  10/1987  Inagoya et al. .................. 360/119 X

FOREIGN PATENT DOCUMENTS

| 0085611 | 5/1985 | Japan | 360/118 |
| 0068709 | 4/1986 | Japan | 360/125 |
| 0074121 | 4/1986 | Japan | 360/118 |
| 0162813 | 7/1986 | Japan | 360/118 |
| 2012909 | 1/1987 | Japan | 360/118 |

*Primary Examiner*—Robert S. Tupper
*Assistant Examiner*—Andrew L. Sniezek
*Attorney, Agent, or Firm*—Antonelli, Terry & Wands

[57] ABSTRACT

A tunnel erasing-type magnetic head having a short distance between the gaps, wherein a second core half is sandwiched between the first core half and the third core half, a magnetic gap for recording and reproducing the signals is formed between the first core half and the second core half, and a magnetic gap for erasing is formed between the second core half and the third core half, so that the second core half can be utilized for both recording and reproducing the signals and erasing the signals. The second core half is obtained by forming a thin magnetic film of a high saturation flux density on the base portion composed of a nonmagnetic material that forms the magnetic gap. The first and third core halves are also obtained by forming a thin magnetic film of a high saturation flux density on the magnetic gap surfaces of the base portions to produce performance that can be used for the magnetic recording media having high coercive force. The magnetic head has a short distance between the gaps. When used for a floppy disk apparatus, therefore, there does not develop under-erasing or over-erasing even for small disks, and the effective track width does not decrease, either. This head can be used also as the one in which an ordinary erasing head element and a recording and reproducing head element are combined together.

9 Claims, 5 Drawing Sheets

FIG. 4a  FIG. 4b  FIG. 4c
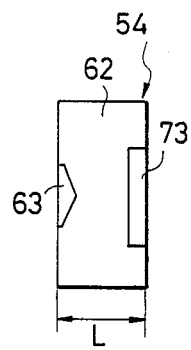 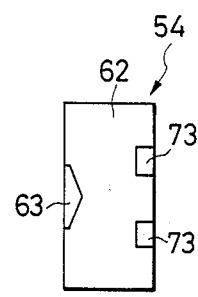 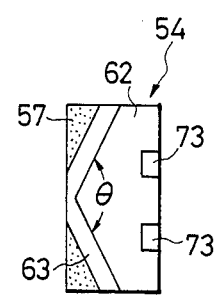
FIG. 5
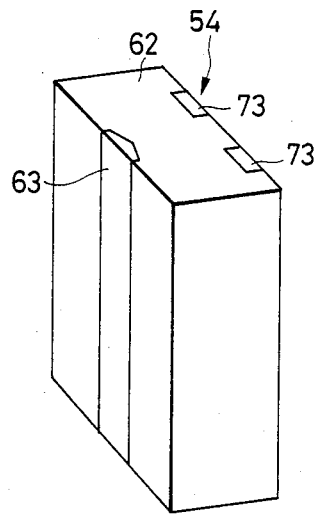

MAGNETIC HEAD HAVING SHORT DISTANCE BETWEEN GAPS FOR RECORDING REPRODUCING AND ERASING

BACKGROUND OF THE INVENTION

The present invention relates to a magnetic head, and particularly to a tunnel erase type magnetic head which has a recording and reproducing head core and an erasing head core, and which can be suitably adapted to a floppy disk apparatus for high-density magnetic recording.

A magnetic head widely used in the general floppy disk-type magnetic recording and reproducing apparatus has been disclosed in Japanese Patent Laid-Open No. 44219/1982, having a structure as shown in FIG. 10.

That is, as shown in a plan view of FIG. 10 which views the magnetic head from over a surface facing the recording medium, the above-mentioned conventional magnetic head consists of a magnetic recording and reproducing head 10 composed of ferrite, an erasing head 11 and a nonmagnetic material 12 which blocks the magnetic effect between the two heads.

Unlike a rigid disk apparatus, the floppy disk apparatus requires interchangeability of disk. That is, it is required to provide an erase band between the tracks on which signals are recorded, in order to maintain interchangeability among the apparatuses and magnetic recording media, and to correct the shift of rotary shaft of a drive device or the shift of recording medium chuck and to correct the expansion or contraction of the medium and mechanical parts caused by the change of temperature and humidity. In a floppy disk without a track servo mechanism, it is necessary to prevent the effect from the neighboring tracks.

For this purpose, a tunnel erasing method is employed in which an erasing head core 11 is arranged at the back of the recording and reproducing head core 10 as shown in FIG. 10 in order to trim both edges of the track on which the signals are recorded. In this tunnel erasing system, there is arranged the nonmagnetic material 12 to prevent magnetic effect between the two heads.

Operation of the magnetic head will now be described in conjunction with FIG. 11. First, a signal is recorded onto a region 15 of a track width $l_1$ of a magnetic gap 13 of the magnetic recording and reproducing head 10, and then overlapped portions $d_1$, $d_2$ are erased as erasing regions 16 by a magnetic gap of the erasing head 11, whereby the practical width of the recording track becomes as denoted by $l_2$. The overlapped portions $d_1$ and $d_2$ remain constant in the apparatus in which the recording medium moves linearly. In an apparatus which undergoes a circular motion such as a floppy disk, however, the overlapped portions $d_1$ and $d_2$ vary depending upon the radial direction r of the medium and a distance L between the magnetic gap 13 for recording and reproducing the signals and the magnetic gap 14 for erasing the signals.

This relationship will now be described with reference to FIGS. 12 and 13. FIG. 12 shows the case where the distance L is small and FIG. 13 shows the case where the distance L is large. As the distance L increases as shown in FIG. 13, the effective track width $l_2'$ after erasing becomes smaller than the distance $l_2$ between the erasing gaps. Therefore, the effective track width decreases in larger amounts on the inner side of the medium than on the outer side, and this tendency becomes conspicuous as the distance L increases. Further, the overlapped portions $d_1$ and $d_2$ assume different widths, and the under-erasing and over-erasing take place. Because of this fact, the distance L must be reduced between the magnetic gap 13 for recording and reproducing the signals and the magnetic gap 14 for erasing the signals as shown in FIG. 12.

When the apparatus has a high track density or when the floppy disk has a small medium diameter, in particular, the distance L plays an important role.

If thickness of the nonmagnetic material 12 is reduced or if the nonmagnetic material 12 is not provided to solve the above-mentioned problem, the magnetic flux of the recording and reproducing head is affected by the magnetic flux of the erasing head, and recording error takes place. If thicknesses of the two head cores are reduced, on the other hand, the magnetic path loses the efficiency and the mechanical strength is lost.

In the conventional head, furthermore, the core is composed of a ferrite, and the signals are not sufficiently recorded onto a medium having a high coercive force such as a metal floppy disk; i.e., the head is not adapted to the high-density recording apparatus. In order to solve such a problem, European Patent Laid-Open No. 0140977 discloses a tunnel erasing-type magnetic head in which a portion constituting a magnetic gap surface of the magnetic head is coated with a magnetic layer of a high saturation flux density. As a prior application of such a magnetic head, furthermore, there can be cited U.S. patent application Ser. No. 739,447 (which is simply a prior application but is not a prior art). By using the thus constructed tunnel erasing-type magnetic head, the signals can be sufficiently recorded even onto a medium having a high coercive force, accompanied, however, by such defects as reduced effective track width and the development of under-erasing and over-erasing.

The following references are cited to show the state of the art; Japanese Patent Laid-Open Nos. 185015/1984 and 256904/1985.

SUMMARY OF THE INVENTION

The object of the present invention is to provide a magnetic head for a high-density recording apparatus, in which the distance is sufficiently reduced between the magnetic gap of the recording and reproducing magnetic head and the magnetic gap of the erasing head, and which has a magnetic thin film of a high saturation flux density opposed to the magnetic gaps, so that the signals can be sufficiently recorded or reproduced or even erased for a recording medium having a high coercive force.

In order to achieve the above object, the present invention deals with a magnetic head which consists of a recording and reproducing head and an erasing head arranged in series therewith, wherein there are provided three core base portions to reduce the distance between the magnetic gap of the recording and reproducing head and the magnetic gap of the erasing head.

Namely, the magnetic head comprises as a unitary structure (i) a first head element which consists of a first core half on which is deposited a thin magnetic film having a high saturation flux density on a side surface opposed to the magnetic gap and a second core half, that are joined together, a magnetic gap for recording and reproducing the signals being formed therebetween, and (ii) a second head element in which the other surface of the second core half is joined to a third core half, a magnetic gap for erasing the signals being formed therebetween.

According to the magnetic head of the present invention, furthermore, the core base portions have deposited thereon thin magnetic films of a high saturation flux density on the surfaces opposed to the magnetic gaps, base portions of the first and third core halves are composed of a high permeability ferrite, and the second core base portion, i.e., the common core base portion is composed of a nonmagnetic material.

According to another structure, base portions of the first and third core halves and the base portion of the second common core are composed of a nonmagnetic material, and the magnetic path is formed by the above-mentioned thin magnetic film having high saturation flux density.

In order to avoid the formation of pseudogap, at least the interface between the base portion and the thin magnetic film deposited on the base portion of the recording and reproducing core is preferably so formed as will not become in parallel with the magnetic gap.

The thin magnetic film deposited on the base portion of the second common core can desirably be buried in the groove of the base portion of the common core, so that the head can be easily fabricated.

Examples of the thin magnetic film material include amorphous ferromagnetic alloys, Fe-Al-Si system alloys, Ni-Fe system alloys and the like, that have saturation flux densities greater than those of a high permeability ferrite, and that can be deposited by thin film-forming technology such as evaporation, sputtering or the like. Though there is no particular limitation, the magnetic thin film is usually formed having a thickness over a range of 3 $\mu$m to 100 $\mu$m. If the thickness is smaller than 3 $\mu$m, the magnetic path exhibits an increased reluctance to lose the efficiency. If the thickness is greater than 100 $\mu$m, the magnetic film is formed requiring an extended period of time and giving disadvantage in economy, which, however, is not so substantial.

The magnetic head of the present invention has a magnetic film of a high saturation flux density deposited maintaining a predetermined thickness on the surfaces opposed to the magnetic gaps as described above, and is capable of recording the data sufficiently even onto a medium having a high coercive force (greater than 1000 oersteds). Further, the core base portion is composed of a magnetic material such as a high permeability ferrite or a nonmagnetic material such as a ceramic, a crystallized glass or a nonmagnetic ferrite, and exhibits excellent abrasion resistance.

According to the magnetic head of the present invention, the second core serves as a common base portion for the recording and reproducing core and for the erasing core, and a thin magnetic film is buried therein making it possible to shorten the distance between the magnetic gap for recording and reproducing the signals and the magnetic gap for erasing the signals. According to the conventional art, for instance, the distance was about 600 $\mu$m at the shortest. According to the present invention, on the other hand, the distance can be easily shortened to about 100 $\mu$m. This makes it possible to highly densely record the signals, and to prevent the development of difference of loci between the recording and reproducing gap and the erasing gap even with a disk-like medium having a small radius. Here, if the above-mentioned distance is shortened to be smaller than 100 $\mu$m, it becomes difficult to shape the second core base portion. According to the present invention, therefore, the distance between the magnetic gap for recording and reproduction and the magnetic gap for erasing should lie over a range of from 100 $\mu$m to 600 $\mu$m. If the distance is greater than 600 $\mu$m, advantage in characteristics decreases greatly or is lost over the conventional art.

BRIEF DESCRIPTION OF THE DRAWINGS

FIGS. 4a to 4c are plan views illustrating representative portions of a second core portion according to the present invention;

FIG. 5 is a perspective view of FIG. 4b;

DESCRIPTION OF THE PREFERRED EMBODIMENTS

Figure 1:
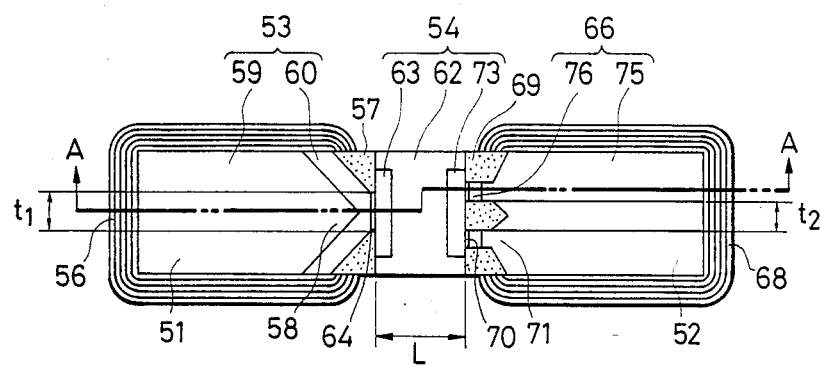
FIG. 1 is a plan view of a magnetic head according to an embodiment of the present invention when it is seen from over a surface facing the recording medium.
Figure 2:
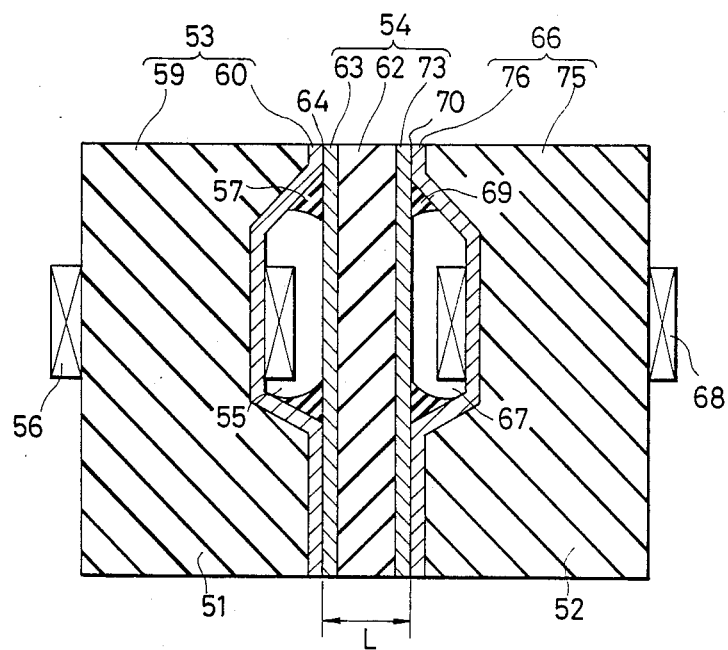
FIG. 2 is a vertical section view along the line A—A of the magnetic head of FIG. 1.

Embodiment 1:

FIG. 1 is a schematic plan view of a magnetic head according to a first embodiment when it is seen from over the surface facing the recording medium, and FIG. 2 is a section view along the line A—A of FIG. 1. The magnetic head is used for a floppy magnetic disc recording and reproducing apparatus, and is chiefly constituted by a recording and reproducing head element 51 and an erasing head element 52. These elements are mounted as a unitary structure on a head-holding member (not shown) in such a manner that the recording and reproducing head element 51 is located on the upstream side of a magnetic recording medium (magnetic disk) in a direction in which it runs and that the erasing head 52 is located on the downstream side.

The recording and reproducing head element 51 is chiefly constituted by a first core member in the form of a core half 53, a second core member half 54 opposed thereto, and an exciting coil 56 wound on a coil groove 55 formed in the first core half 53. Reference numeral 57 denotes a reinforcing layer composed of a nonmagnetic material, such as glass, which is provided near the junction portion between the first core half 53 and the second core half 54.

The first core half 53 consists of a first core base portion 59 having a mountain-shaped protuberance 58 nearly at the center on the side surface opposed to a magnetic gap 64, and a first thin magnetic film 60 deposited on the side surface.

A second core half 54 consists of a second core base portion 62 and a second thin magnetic film 63 which is deposited on the above-mentioned side surface and which is composed of a magnetic material having a high saturation flux density and a high permeability. The second thin magnetic film 63 is deposited in a groove of the second core base portion 62. Here, the track width forming the magnetic gap is denoted by $t_1$.

Figure 3:
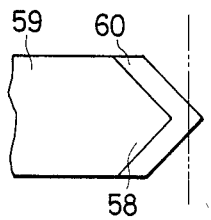
FIG. 3 is a diagram illustrating a step for fabricating a core half that constitutes the first embodiment of FIG. 1.

As shown in FIG. 3, the aforementioned first core half 53 is prepared by forming a thin magnetic film 60 on the tilted surfaces and on the protuberance 58 of the core base portion 59 by evaporation, sputtering, or the like, and then cutting the end of the magnetic thin film 60 as indicated by a two-dot chain line. A flat portion after the end is cut defines a track width $t_1$.

The erasing head element 52 is chiefly constituted by the second core member half 54, a third core member 66 opposed thereto, and an exciting coil 68 wound on a coil groove 67 that is formed in the third core member half 66. Reference numeral 69 denotes a reinforcing layer composed of a nonmagnetic material, such as glass, which is provided near the junction portion between the second core half 54 and the third core half 66.

The second core half 54 consists of the second core base portion 62 opposed to a magnetic gap 70 and a third thin magnetic film 73 which is deposited on the side surface thereof and which consists of a magnetic material having a high saturation flux density and a high permeability. The third magnetic thin film 73 is deposited onto the groove of the second core base portion 62.

The third core half 66 consists of a third core base portion 75 which has two mountain-shaped protuberances 71 maintaining a predetermined distance on the side surface thereof opposed to the magnetic gap 70, and a fourth thin magnetic film 76 which is deposited on the above side surface and which is composed a magnetic material having a high saturation flux density and a high permeability.

The magnetic gap 64 of the recording and reproducing head element 51 and the two magnetic gaps 70 of the erasing head element 52 define a relationship of positions as shown in FIG. 1. Namely, a recording track $t_1$ is formed by the recording and reproducing head 51 on the magnetic recording medium, and immediately thereafter, portions at both edges of the recording track are erased by the magnetic gaps 70 of the erasing head 52 to define an effective track width $t_2$.

According to the magnetic head of the present invention in which the distance L is reduced as far as possible between the magnetic gap 64 of the recording and reproducing head and the magnetic gaps 70 of the erasing head, the inner side of the track is not over-erased and the outer side is not under-erased even when the erasing gaps are arranged at the back of the recording and reproducing magnetic gap 64 in parallel therewith, and the offtrack margin is not decreased. Further, since the second core base portion serves as a common base portion for the recording and reproducing head and for the erasing head, it is possible to reduce the distance L between these gaps. Moreover, since the common base portion is composed of a nonmagnetic material, magnetic effect between the two magnetic heads can be sufficiently prevented.

The first core base portion 59 and the third core base portion 75 are composed of a ferrite having a high permeability, such as an Mn-Zn ferrite or an Ni-Zn ferrite. Or, a nonmagnetic material may be employed such as a ceramic or a crystallized glass. The second core base portion 62 also plays the role of blocking the magnetic effect between the recording and reproducing head and the erasing head as described earlier, and is composed of a nonmagnetic material such as a nonmagnetic ferrite, e.g., a ceramic, crystallized glass or zinc ferrite.

On the other hand, the first magnetic thin film 60, second thin magnetic film 63, third thin magnetic film 73 and fourth thin magnetic film 76 are composed of a crystalline alloy or an amorphous alloy having a high saturation flux density and a high permeability. Examples of the crystalline alloy include widely known Fe-Al-Si system alloy, Fe-Si system alloy and Ni-Fe system alloy. Examples of the amorphous alloy include, as is widely known, alloys composed of one or more elements selected from the group consisting of iron, nickel and cobalt, and one or more elements selected from the group consisting of phosphorus, carbon, boron and silicon or one or more elements selected from the group consisting of zirconium, niobium, hafnium, yttrium, and germanium, and alloys chiefly composed of the above-mentioned elements and to which are further added such elements as beryllium, aluminum, tin, molybdenum, indium, tungsten, titanium, tantalum, manganese and chromium.

The first to fourth magnetic thin films may be composed of the same magnetic material, or may be composed of two or more kinds of magnetic materials.

In the cross section of core shown in FIG. 2, furthermore, the core shape of the rear magnetic path is simply one example which should in no way be limited thereto only. For example, when the core base portion is composed of a ferrite, the closed magnetic path needs not be constituted by a thin magnetic film. A separate core bar may be disposed at the rear portion.

Embodiment 2:

FIGS. 4a to 4c illustrate major portions of the second core half according to a second embodiment of the present invention, wherein FIGS. 4a, 4b and 4c are plan views showing representative examples of the second core as viewed from over the surface facing the recording medium, the second core commonly serving for the recording and reproducing core and for the erasing core. In the following description, the same constituent members and the same parts are denoted by the same reference numerals.

With reference to FIG. 4a, a groove is formed in the surface of the second core base portion 62 composed of a crystallized glass opposed to the recording and reproducing core half, the groove having a width nearly equal to that of the track and having a depth of 50 $\mu$m. Onto the groove is deposited by sputtering a widely known Co-Nb-Zr amorphous alloy 63 to form a thin magnetic film. The bottom of the groove has a structure that is not in parallel with a gap face. Next, another groove is formed in the other surface opposed to the erasing core, the groove having a width to include two erasing gaps and having a depth of 50 $\mu$m. Onto the groove is deposited by sputtering a Co-Nb-Zr amorphous alloy 73. Thereafter, both surfaces are polished to remove unnecessary portion of the magnetic films thereby to form the second core half 54. The core width L determines the distance between the magnetic gap of the recording and reproducing head and the magnetic gap of the erasing head, and the distance L is selected to be 350 $\mu$m.

It has been confirmed that the nonmagnetic base portion that defines the distance L is capable of sufficiently withstanding the machining even when its thickness is selected to be 100 μm. The groove is processed by machining, etching, ion milling or laser machining.

When the track width is as narrow as 50 μm or less, the distance L should be selected to be 350 μm or 100 μm, so that there will not develop under-erasing or over-erasing even with a disk of a size smaller than 5 inches or smaller than 3 inches. In this case, the effective track width is not decreased, either.

With reference to FIG. 4b, two grooves are formed in the surface of the erasing core side so as to be corresponded to the magnetic gaps for erasing, and the magnetic film 73 is deposited thereon. This structure is desirable since there is exhibited no erasing function in the portions other than the magnetic gaps.

With reference to FIG. 4c, a mountain-shaped protuberance is formed on the side opposed to the recording and reproducing core, the magnetic thin film 63 is deposited on the mountain-shaped portion, a glass 57 is charged, and unnecessary portions are removed by polishing to form a desired track width $t_1$. Here, the angle $\theta$ of the mountain-shaped portion is preferably greater than 90° but smaller than 160°.

FIG. 5 is a perspective view of the core portion of FIG. 4b.

Figure 6A:
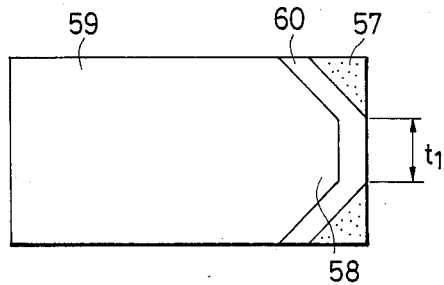
FIGS. 6a to 6c are plan views of a first core half that illustrates representative portions of the recording and reproducing core half of the present invention.
Figure 6B:
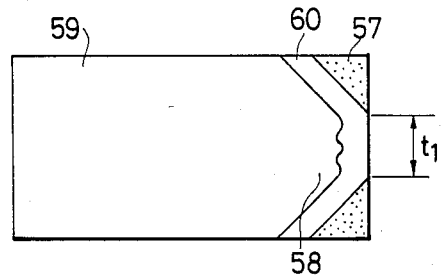
Figure 6C:
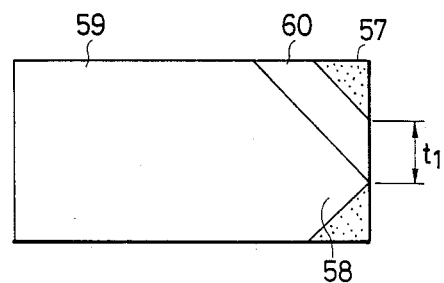

FIGS. 6a to 6c are plan views showing a representative examples of the first core half of the recording and reproducing head core as viewed from over the surface facing the recording medium. Examples adapted to narrow tracks of a width of smaller than 50 μm were shown in FIGS. 1 and 3. FIGS. 6a and 6b show the structures in which the end of the mountain-shaped protuberance 58 of the core base portion 59 is broadened so as to be adapted to a track having a width of as great as 50 μm or more. FIG. 6c shows the structure in which a thin magnetic film 60 is deposited on one surface of the mountain-shaped protuberance 58 of the core base portion 59. This structure is adapted to a narrow track width which is defined by the thickness of the magnetic thin film 60.

Figure 7A:
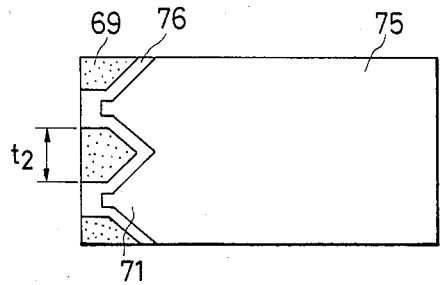
FIGS. 7a to 7c are plan views of a third core half illustrating representative portions of an erasing core half of the present invention.
Figure 7B:
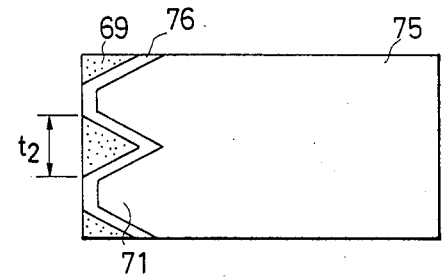
Figure 7C:
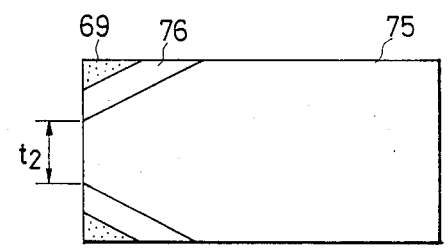

FIGS. 7a to 7c are plan views illustrating a representative examples of the third core half of the erasing head core as viewed from over the surface facing the recording medium.

FIGS. 7a and 7b illustrate the structures in which two mountain-shaped protuberances 71 are formed on the portions of the core base portion 75 opposed to the gaps, a thin magnetic film 76 is deposited thereon, a glass 69 is charged, and a gap face is polished to obtain an effective recording signal width $t_2$. The base portion 75 is composed of a ferrite or a nonmagnetic bulky member. FIG. 7c shows another structure of when the core base member 75 is composed of a nonmagnetic bulky member. In this case, only one mountain-shaped protuberance 71 is formed, the magnetic thin film 76 is deposited on both side surfaces of the mountain-shaped protuberance, and the thin magnetic film 76 is divided by the mountain-shaped protuberance to define the effective recording width $t_2$.

Figure 8A:
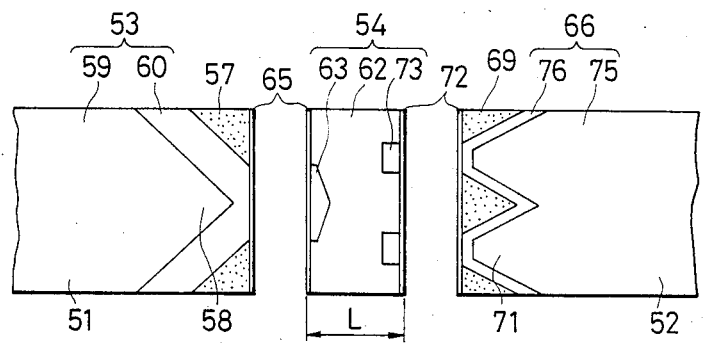
FIGS. 8a to 8c are plan views illustrating a representative structure in which the core halves of the present invention are combined together.
Figure 8B:
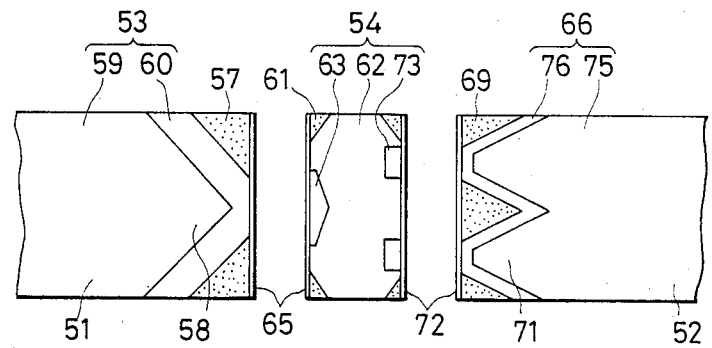
Figure 8C:
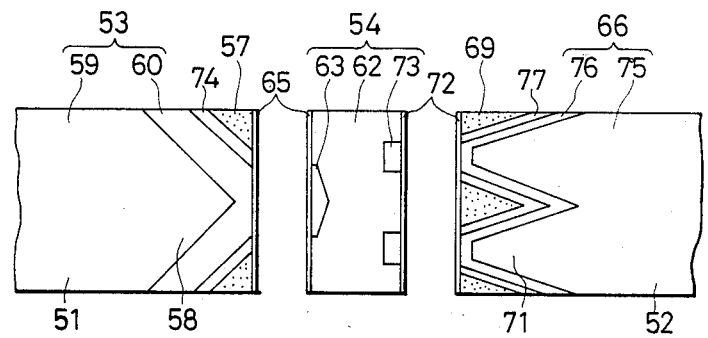

FIGS. 8a to 8c are plan views illustrating representative examples of when the aforementioned magnetic head core-constituting members are combined together, as viewed from over the surface facing the recording medium. The following description mainly deals with the steps for forming gaps and junction.

FIG. 8a is a diagram illustrating a structure in which the above-mentioned three core halves are arranged and joined as a unitary structure. First, gap films 65 are formed on the magnetic gap-forming surfaces of the first core half 51 for recording and reproducing and of the second core half 54, and gap films 72 are formed on the magnetic gap-forming surfaces of the second core half 54 and of the erasing third core half 52, followed by heating and press-adhesion, in order to obtain a magnetic head of a unitary structure.

The gap films 65 and 72 may be composed of a high-melting nonmagnetic film such as of $SiO_2$ or $Al_2O_3$ and may be formed on either side, and onto the other side may be formed a low-melting glass film to produce adhesiveness. Or, a multi-layer film may be formed so that it regulates the gap and produces the adhesiveness.

FIG. 8b shows the structure in which ends of the second core half 54 are cut, the glass 61 is charged, and gap films 65 and 72 composed, for example, of $SiO_2$ are formed, followed by heating and press-adhesion. In the step of heating, the charged glasses 57, 61 and 69 are softened or melted, such that the gap films 65 and 72 are melted and joined together with the charged glass.

FIG. 8c shows the structure of core in which magnetic thin films 60 and 76 are deposited on the core base portion, high-melting nonmagnetic films 74 and 77 are formed, and then glasses 57 and 69 are charged. According to this structure, the magnetic film is prevented from reacting with the glass.

Embodiment 3:

Described below is a embodiment in which the present invention is adapted to another head structure.

Figure 9:
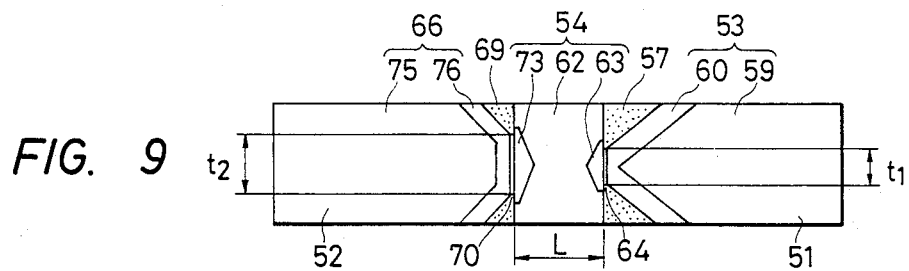
FIG. 9 is a plan view illustrating another embodiment of the present invention.
Figure 10:
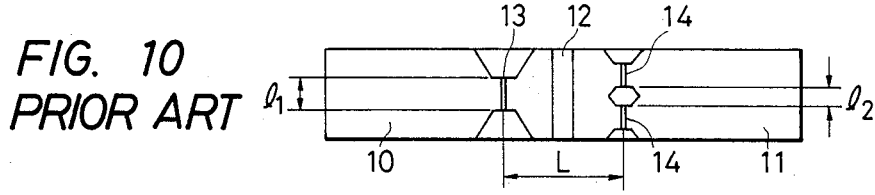
FIG. 10 is a plan view showing the structure of a conventional magnetic head.
Figure 11:
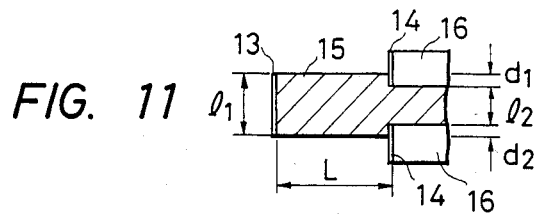
FIGS. 11, 12 and 13 are schematic diagrams showing relationships of positions between the recording track and the erasing track.
Figure 12:
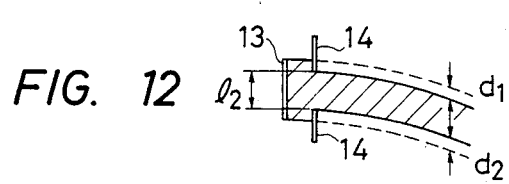
Figure 13:
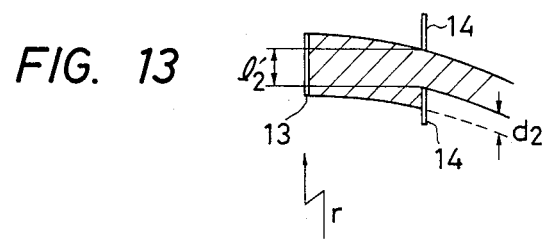

FIG. 9 is a plan view of the magnetic head as viewed from over the surface facing the recording medium. The magnetic head consists of an erasing head element on the upstream side of the magnetic recording medium in the direction in which it runs, and a recording and reproducing head element 51 on the downstream side. A magnetic gap 70 of the erasing head and a magnetic gap 64 of the recording and reproducing head are nearly on the same straight line, and the track width $t_3$ of the erasing head is broader than the track width $t_1$ of the recording and reproducing head. The signals that had been recorded are erased by the erasing head of the upstream side, and new signals are recorded thereon by the recording and reproducing head of the downstream side. With such a magnetic head, if the distance L is great between the magnetic gap of the erasing head and the magnetic gap of the recording and reproducing head, the not-erased portion develops by a length of the distance L at the time when the erasing is initiated, and the non-signal portion develops at the time when the erasing is finished. It is therefore desired to decrease the distance to a degree that does not yet cause the two heads to be magnetically affected by each other. This can be accomplished by the present invention.

According to the magnetic head for floppy disk apparatus of the present invention as described above, the distance is reduced between the magnetic gap of the recording and reproducing head and the magnetic gap of the erasing head, permitting the magnetic head to be sufficiently adapted to disks that are 3.5 inches in diameter, 2.5 inches in diameter or 2 inches in diameter. In the conventional magnetic heads, the distance between the magnetic gaps was from 600 to 900 μm. According to the present invention, on the other hand, the distance between the magnetic gaps can be reduced to about 100 μm without developing any difficulty. When the track width was reduced to 50 μm or smaller, so far, under-erasing or over-erasing developed with the disk of 5 inches or less in diameter, and the effective track width was also decreased.

Compared with the conventional ferrite head, the magnetic head of the present invention has magnetic thin films of a high saturation flux density and a high permeability formed near the magnetic gaps. Therefore, the magnetic head of the present invention exhibits increased recording ability and increased erasing ability, making itself applicable to recording media having a high coercive force and further making itself utilizable as a magnetic head for high-density recording. Moreover, the magnetic head constituted by the combination of core base portions composed of a bulky member and magnetic thin films, exhibit excellent rubbing-proof property. The combination of the bulky members and the thin films contributes greatly to reducing the distance between the magnetic gap of the recording and reproducing head and the magnetic gap of the erasing head.

According to the present invention, furthermore, the magnetic head can be fabricated without involving difficulty. For instance, a mountain-shaped protuberance or a groove is formed in the core base portion, and a thin magnetic film is deposited thereon. Therefore, the thin magnetic film is not peeled off during the steps for fabricating the magnetic head, and no difficulty is involved in handling the same, making it possible to greatly increase the yields.

What is claimed is:

1. A magnetic head comprising a first core member, a second core member and a third core member that are coupled together as a unitary structure;

said second core member having a base portion composed of non-magnetic material sandwiched between said first core member and said third core member;

means including facing surfaces on said first and second members at one side of said second member for forming a magnetic signal recording and reproducing gap;

means including facing surfaces on said third and second members at a side opposite said one side of said second member for forming a magnetic signal erase gap;

a thin magnetic film having a high saturation flux density disposed on the surface of said second member which faces the magnetic recording and reproducing gap;

at least one thin magnetic film having a high saturation flux density deposited on the surface of said second member which faces the magnetic erase gap; and wherein said thin magnetic films deposited on the base portion of said second core member are buried in said base portion such that the base portion completely surrounds said films except for the surfaces facing the gaps and wherein the widths of said magnetic films are at least in the area adjacent the respective gaps.

2. A magnetic head according to claim 1, wherein said first and third core members have base portions which are composed of a high permeability ferrite.

3. A magnetic head according to claim 1, wherein said first and/or said third core members have base portions which are composed of a nonmagnetic material and wherein said first core member has a thin magnetic film having a high saturation flux density deposited on the surface facing said magnetic recording and reproducing gap.

4. A magnetic head according to claim 1, wherein said first core member has a base portion composed of a non-magnetic material and a thin magnetic film deposited on the base portion at an interface, the interface being not parallel to the magnetic gap face formed by said thin magnetic film and with the thin magnetic film on said second core member.

5. A magnetic head according to claim 1, wherein said first and/or said third core members have base portions which are composed of a non-magnetic material and wherein said third core member has at least one thin magnetic film having a high saturation flux density deposited on the surface facing said magnetic erase gap.

6. A magnetic head according to claim 1, wherein said first and/or said third core members have base portions which are composed of a non-magnetic material and wherein said first core member has a thin magnetic film having a high saturation flux density deposited on the surface facing said magnetic recording and reproducing gap and said third core member has at least one thin magnetic film having a high saturation flux density deposited on the surface facing said magnetic erase gap.

7. A magnetic head according to claim 1, wherein said first and third core members have base portions which are composed of a high permeability ferrite and wherein said first core member has a thin magnetic film having a high saturation flux density deposited on the surface facing said magnetic recording and reproducing gap.

8. A magnetic head according to claim 1, wherein said first and third core members have base portions which are composed of a high permeability ferrite and wherein said third core member has at least one thin magnetic film having a high saturation flux density deposited on the surface facing said magnetic erase gap.

9. A magnetic head according to claim 1, wherein said first and third core members have base portions which are composed of a high permeability ferrite and wherein said first core member has a thin magnetic film having a high saturation flux density deposited on the surface facing said magnetic recording and reproducing gap and said third core member has at least one thin magnetic film having a high saturation flux density deposited on the surface facing said magnetic erase gap.

* * * * *